(No Model.)
D. KERSHAW.
DEVICE FOR REPAIRING BROKEN SHAFTS.
No. 516,602. Patented Mar. 13, 1894.
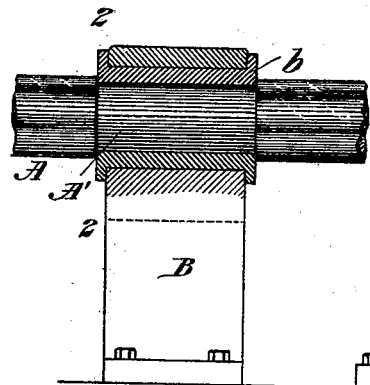
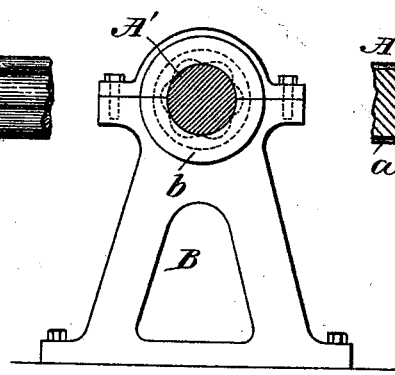
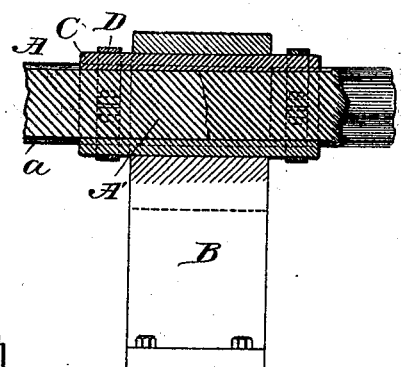
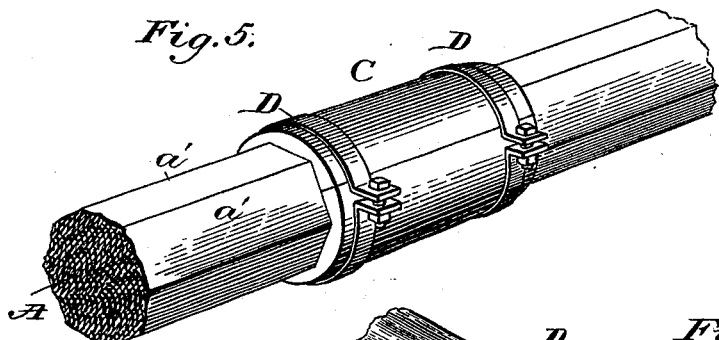
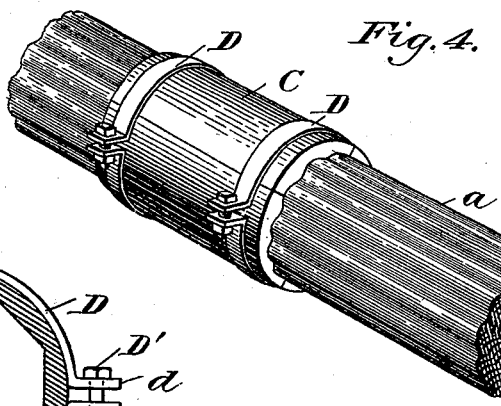
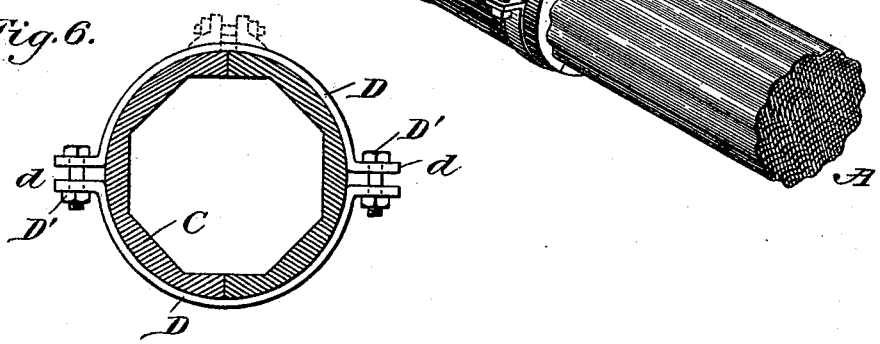
Witnesses
Inventor
Daniel Kershaw
THE NATIONAL LITHOGRAPHING COMPANY,
WASHINGTON, D. C.

UNITED STATES PATENT OFFICE.

DANIEL KERSHAW, OF FALL RIVER, MASSACHUSETTS, ASSIGNOR OF ONE-THIRD TO REYNDERDT SCHUUMAN, OF SAME PLACE.

DEVICE FOR REPAIRING BROKEN SHAFTS.

SPECIFICATION forming part of Letters Patent No. 516,602, dated March 13, 1894.

Application filed March 6, 1893. Serial No. 464,813. (No model.)

*To all whom it may concern:*

Be it known that I, DANIEL KERSHAW, a citizen of the United States, residing at Fall River, in the county of Bristol and State of Massachusetts, have invented certain new and useful Improvements in Devices for Repairing Broken Shafts; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to shafting, and its object is to enable propeller shafts to be quickly and strongly repaired when broken especially when at sea.

Propeller shafts are usually made circular in cross section, so that when broken it is very difficult to fasten to the two portions any kind of clamp which will resist the great torsional strain to which the shaft is subjected.

My invention obviates this difficulty, and it consists in forming the shaft non-circular in cross section such as polygonal or fluted, and providing split sleeves to fit the shaft, the sections of the sleeve being held on the shaft by suitable clamping devices.

In the drawings, Figure 1 is an axial section of a portion of a shaft and pillow block. Fig. 2 is a cross section thereof on line 2—2. Fig. 3 is an axial section showing the shaft broken in the bearing, and provided with a coupling sleeve. Fig. 4 is a perspective view of the shaft and sleeve. Fig. 5 is a similar view of a polygonal shaft, and Fig. 6 is a cross section of the coupling sleeve for said shaft.

The shaft A is made with a fluted surface, as in Figs. 1, 2, 3 and 4 or polygonal as in Fig. 5. At the pillow blocks, B it is turned down to the size of a circle inscribed inside the flutings $a$ or the sides $a'$, to form a cylindrical journal A'. The pillow block is bored out cylindrically and is fitted with removable brasses $b$ fitting the journal A'. Should the shaft break between the pillow blocks it is easily repaired by placing the two sections of the shaft in line and coupling them by means of a sleeve C, which is split into two or more pieces to enable it to be readily applied to the shaft. The inner surface of the sleeve is shaped to fit the surface of the shaft, and the parts of the sleeve are clamped firmly upon the shaft by means of suitable devices, such as the straps D united by the bolts D' passing through ears $d$. Or, lugs may be formed near the meeting edges of the parts of the sleeve, and the bolts passed through said lugs, as indicated in Fig. 6. The sleeve interlocks with the two sections of the shaft and transmits from one to the other the torsional energy of the engine. Should the shaft break in a bearing, the brasses $b$ are removed, and the sleeve is so applied as to engage with the non-circular portion of each section of the shaft, on each side of the pillow block, as shown in Fig. 3. These portions of the inner surface of the sleeve which lie nearest to the axis, of the shaft are tangent to the journal A', and so support the shaft rigidly the entire length of the sleeve. The outer surface of the sleeve, when used in a bearing, is made cylindrical to fit the cylindrical bore of the pillow block, in which the sleeve and shaft rotate, the sleeve filling the space previously occupied by the brasses $b$.

Having thus described my invention, what I claim, and desire to secure by Letters Patent, is—

1. The combination with a propeller shaft non circular in cross section, and provided with a cylindrical journal, of a sleeve longer than the journal and adapted to fit the non-circular portions of the shaft on each side of the journal, and having its external surface cylindrical, substantially as described.

2. The combination with a propeller shaft, non-circular in cross section and provided with a cylindrical journal, of a sleeve longer than the journal, and adapted to fit the non-circular portion of the shaft on each side of the journal and also rest rigidly upon the journal, substantially as described.

3. The combination with a pillow block having a cylindrical bore, of a non-cylindrical shaft having a journal smaller than the bore in the pillow block, and a sleeve clamped upon the journal and the adjacent portions of the shaft, and having a cylindrical surface fitting the bore in the pillow-block, substantially as described.

In testimony whereof I affix my signature in presence of two witnesses.

DANIEL KERSHAW.

Witnesses:
ARBA N. LINCOLN,
GEO. O. LATHROP.